United States Patent [19]

Sakabe et al.

[11] Patent Number: 5,093,426

[45] Date of Patent: Mar. 3, 1992

[54] HYDROGENATED COPOLYMER RUBBER, RUBBER COMPOSITION COMPRISING SAID RUBBER AND RUBBER PRODUCT OBTAINED FROM THE RUBBER

[75] Inventors: Nobuyuki Sakabe; Toshio Ohhara; Toshio Miyabayashi, all of Yokkaichi; Hiroshi Ise, Choshi, all of Japan

[73] Assignee: Japan Synthetic Rubber Co., Ltd., Tokyo, Japan

[21] Appl. No.: 424,085

[22] Filed: Oct. 19, 1989

[30] Foreign Application Priority Data

Oct. 22, 1988 [JP] Japan .................. 63-266982
Nov. 11, 1988 [JP] Japan .................. 63-285136
Aug. 30, 1989 [JP] Japan .................. 1-221662

[51] Int. Cl.$^5$ .............................................. C08F 8/04
[52] U.S. Cl. ................................... 525/223; 525/227; 525/328.9; 525/329.6; 525/329.7; 525/330.3; 525/338; 525/339
[58] Field of Search ............ 525/328.9, 329.6, 329.7, 525/330.3, 223, 227

[56] References Cited

U.S. PATENT DOCUMENTS 3,416,899 12/1968 Schiff .
3,483,275 12/1969 Waterman et al. .
4,533,482 8/1985 Bollinger .......................... 525/338

Primary Examiner—Bernard Lipman
Attorney, Agent, or Firm—Oblon, Spivak, McClelland, Maier & Neustadt

[57] ABSTRACT

A hydrogenated copolymer rubber which is a hydrogenation product of a random copolymer rubber consisting of:

(A) 30-70 mole % of a unit derived from at least one monomer selected from the group consisting of alkyl acrylates and alkoxy-substituted alkyl acrylates, (B) 20-70 mole % of a unit derived from at least one conjugated diene, and (C) 0-10 mole % of a unit derived from at least one other ethylenically unsaturated compound copolymerizable with the components (A) and (B) [(A)+(B)+(C)=100 mole %] wherein at least 90% of the double bonds of the conjugated diene unit is hydrogenated; a crosslinkable rubber composition comprising said hydrogenated copolymer rubber and a crosslinking agent; and a thermoplastic polymer comprising said hydrogenated copolymer rubber and a thermoplastic resin. These rubbers and compositions are superior in low-temperature resistance, heat resistance, ozone resistance, mechanical strengths, compression set, impact resilience and oil resistance.

13 Claims, 4 Drawing Sheets

HYDROGENATED COPOLYMER RUBBER, RUBBER COMPOSITION COMPRISING SAID RUBBER AND RUBBER PRODUCT OBTAINED FROM THE RUBBER

This invention relates to a hydrogenated copolymer rubber superior in low-temperature resistance, heat resistance, ozone resistance, mechanical strengths, compression set and impact resilience and useful as a highly durable oil-resistant rubber material, as well as to a rubber composition comprising the rubber and a rubber product obtained from said rubber.

Rubber materials used as important parts for engines, their vicinities, underbodies, etc. of automobiles are required to be superior in such properties as low-temperature resistance, heat resistance, ozone resistance, oil resistance, mechanical strengths, compression set, impact resilience and the like.

Chloroprene rubber has conventionally been used as, for example, a covering material for automotive hoses, a material for automotive boots and a material for automotive belts because it is well balanced in various properties. In recent years, however, engine rooms and underfloors of automobiles have come to be exposed to higher temperatures owing to the measures taken for the exhaust gas control and/or the fuel consumption improvement and, as a result, improved heat resistance and ozone resistance have been required for rubber materials used in said applications. Accordingly, chloroprene rubber, which is insufficient in heat resistance and ozone resistance, has gradually been replaced by other rubber materials.

As the rubber materials superior in heat resistance and ozone resistance, there are ethylene-propylene-diene rubber (EPDM), acrylic rubber, fluororubber, silicone rubber, etc.

However, EPDM is inferior in oil resistance; acrylic rubber is inferior in mechanical strengths (e.g. tear strength) and low-temperature resistance; fluororubber is inferior in low-temperature resistance and very expensive, making the use in a large amount uneconomical; and silicone rubber is inferior in mechanical strengths.

Meanwhile, it is known that acrylonitrile-butadiene rubber and butadiene-acrylonitrile-acrylic acid ester rubber, when hydrogenated, show improved heat resistance, improved ozone resistance and improved low-temperature resistance (Japanese Patent Application Kokai Nos. 54-132647, 57-70135 and 63-95242, etc.). However, these improved properties are not yet satisfactory. Further, when the above hydrogenation for property improvement is applied to a copolymer containing, as a component, a large amount of a polar group-containing monomer (e.g. acrylonitrile), it is necessary to use a very expensive platinum group metal as a hydrogenation catalyst.

An object of this invention is to provide an oil-resistant rubber material superior in low-temperature resistance, heat resistance, ozone resistance, mechanical strengths, compression set and impact resilience.

Another object of this invention is to provide a crosslinkable rubber composition comprising the above rubber material and a crosslinking agent.

Still another object of this invention is to provide a rubber product obtained from the above rubber material.

Other objects and advantages of this invention will become apparent from the following description and the accompanying drawings. In the accompanying drawings.

According to this invention, there is provided a hydrogenated copolymer rubber which is a hydrogenation product of a random copolymer rubber consisting of:

(A) 30-70 mole % of a unit derived from at least one monomer [hereinafter referred to as Monomer (A)] selected from the group consisting of alkyl acrylates and alkoxy-substituted alkyl acrylates, (B) 20-70 mole % of a unit derived from at least one conjugated diene [hereinafter referred to as Monomer (B)], and (C) 0-10 mole % of a unit derived from at least one other ethylenically unsaturated compound [hereinafter referred to as Monomer (C)] copolymerizable with the Monomers (A) and (B) [(A)+(B)+(C)=100 mole %], wherein at least 90% of the double bonds of the conjugated diene unit is hydrogenated.

This invention further provides a crosslinkable rubber composition comprising the above hydrogenated copolymer rubber and a crosslinking agent.

This invention furthermore provides a thermoplastic polymer composition comprising 1-80 parts by weight of the above hydrogenated copolymer rubber and 20-99 parts by weight of a thermoplastic resin.

This invention furthermore provides a crosslinkable rubber composition comprising the above hydrogenated copolymer rubber, a rubber co-crosslinkable therewith and a crosslinking agent.

The copolymer rubber used in this invention consists of the units (A) and (B), or the units (A), (B) and (C). An example of the Monomer (A) is an alkyl acrylate represented by the following general formula (I):

wherein $R^1$ is a $C_{1-18}$ alkyl group.

The alkyl acrylate represented by the general formula (I) includes, for example, methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate. Of these, preferable are methyl acrylate, ethyl acrylate, n-propyl acrylate and n-butyl acrylate; more preferable are methyl acrylate and ethyl acrylate.

Another example of the Monomer (A) is an alkoxy-substituted alkyl acrylate represented by the following general formula (II):

wherein $R^2$ is a methylene group, a $C_{2-12}$ alkylene group or a $C_{2-12}$ alkylidene group, and $R^3$ is a $C_{1-12}$ alkyl group.

The alkoxy-substituted alkyl acrylate represented by the general formula (II) includes, for example, 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy)propyl acrylate. Of these, preferable are 2-methoxyethyl acrylate and 2-ethoxyethyl acrylate; and most preferable is 2-methoxyethyl acrylate.

These (A) monomers can be used alone or in combination of two or more.

The conjugated diene which is the Monomer (B) includes, for example, 1,3-butadiene, 1,3-pentadiene, isoprene, 2-neopentyl-1,3-butadiene, 1,3-hexadiene, 2,4-hexadiene, 2,3-dimethyl-1,3-butadiene, 2-ethyl-1,3-butadiene, 1,3-heptadiene and various branched dienes. Of these, preferable are 1,3-butadiene and isoprene.

These (B) monomers can be used alone or in combination of two or more.

The Monomer (C) is other ethylenically unsaturated compound copolymerizable with the Monomers (A) and (B) and includes, for example, methacrylates such as methyl methacrylate, octyl methacrylate and the like; alkyl vinyl ketones such as methyl vinyl ketone and the like; substituted or unsubstituted vinyl ethers such as ethyl vinyl ether, 2-chloroethyl vinyl ether and the like; allyl alkyl ethers such as allyl methyl ether and the like; alkenyl aromatic compounds such as styrene, α-methylstyrene, chlorostyrene, vinyltoluene, vinylbenzyl chloride and the like; alkenyl cyanides such as acrylonitrile, methacrylonitrile and the like; unsaturated carboxylic acid amides such as acrylamide, methacrylamide, N-methylolacrylamide and the like; vinyl chloride; vinylidene chloride; vinylidene fluoride; alkyl fumarates; vinyl acetate; and vinyl chloroacetate. Of these, preferable are methacrylates such as methyl methacrylate, octyl methacrylate and the like; alkyl vinyl ketones such as methyl vinyl ketone and the like; alkyl vinyl ethers such as ethyl vinyl ether and the like; allyl alkyl ethers such as allyl methyl ether and the like; alkenyl aromatic compounds such as styrene, α-methylstyrene, vinyltoluene and the like; alkyl fumarates; and vinyl acetate.

In this invention, there can also be used, as the Monomer (C), an ethylenically unsaturated compound having at least one functional group selected from the group consisting of carboxyl group, amino group, epoxy group and hydroxyl group (said compound is hereinafter referred to as the functional group-containing compound). The use of the functional group-containing compound as the Monomer (C) can provide a hydrogenated copolymer rubber or a composition comprising the rubber, both being excellent in the effect of this invention, particularly in impact resistance, heat deterioration resistance and adhesion.

The carboxyl group-containing monomer as the functional group-containing compound [the Monomer (C)] includes, for example, acrylic acid, methacrylic acid, maleic acid and fumaric acid. Of these, the unsaturated dicarboxylic acids may be used in the form of an acid anhydride.

The amino group-containing monomer as the functional group-containing compound [the Monomer (C)] includes, for example, dimethylaminoethyl (meth)acrylate, diethylaminoethyl (meth)acrylate, N-t-butylaminoethyl (meth)acrylate and 4-anilinophenyl (meth)acrylate.

The epoxy group-containing monomer as the functional group-containing compound [the Monomer (C)] includes, for example, glycidyl (meth)acrylate, allyl glycidyl ether and vinyl glycidyl ether.

The hydroxyl group-containing monomer as the functional group-containing compound [the Monomer (C)] includes, for example, 2-hydroxypropyl (meth)acrylate and hydroxyethyl (meth)acrylate.

Of these functional group-containing compounds as the Monomer (C), preferable are carboxyl group-containing monomers and particularly preferable is maleic anhydride.

The above (C) monomers can be used alone or in combination of two or more.

In the copolymer rubber of this invention, it is necessary that the proportion of the unit (A) be 30–70 mole %, the proportion of the unit (B) be 20–70 mole %, and the proportion of the unit (C) be 0–10 mole % [the proportion of the unit (C) is 0.1–10 mole % when the Monomer (C) is a functional group-containing compound, and (A)+(B)+(C)=100 mole %].

When the proportion of the unit (A) is less than 30 mole %, the resulting rubber composition has poor oil resistance. When the proportion is more than 70 mole %, the rubber composition has poor mechanical strengths and impact resilience. The proportion of the unit (A) is preferably 35–60 mole %.

When the proportion of the unit (B) is less than 20 mole %, the resulting rubber composition has insufficient mechanical strengths and impact resilience. When the proportion is more than 70 mole %, the composition has poor oil resistance.

The proportion of the unit (B) is preferably 33–67 mole %.

The unit (C) is optional. When the proportion of the unit (C) is more than 10 mole %, the resulting rubber composition is poorly balanced in low-temperature resistance, heat resistance, compression set and oil resistance. The proportion of the unit (C) is preferably 5 mole % or less.

When the functional group-containing compound is used as the Monomer (C), the proportion of the unit (C) is 0.1–10 mole %. When the proportion is less than 0.1 mole %, the resulting rubber composition has no adhesion. The proportion of the unit (C) derived from the functional group-containing compound is preferably 0.1–5 mole %.

The hydrogenated copolymer rubber used in this invention can be produced by a method where Monomers (A), (B) and (C) are polymerized and the resulting copolymer rubber is hydrogenated to obtain the hydrogenated copolymer rubber of this invention [hereinafter referred to as Method (D)] and a method where a hydrogenation product of a copolymer consisting of the unit (A) and the unit (B) is reacted with Monomer (C) to obtain the hydrogenated copolymer rubber of this invention [hereinafter referred to as Method (E)].

In a specific example of Method (D), a mixture consisting of 30–70 mole % of Monomer (A), 20–70 mole % of Monomer (B) and 0–10 mole % of Monomer (C) is subjected to emulsion radical polymerization or suspension radical polymerization in an aqueous medium or to solution radical polymerization in an organic solvent, at a polymerization temperature of 0°–100° C. in the presence of a radical polymerization initiator, to easily obtain the copolymer rubber.

When the copolymer rubber is produced by the emulsion radical polymerization, there can be employed a generally known method. For example, the emulsion radical polymerization may be effected at 0°-100° C. in an aqueous medium using, as a polymerization initiator, an ordinary radical initiator (e.g. potassium persulfate, peroxide, azo compound) and, as an emulsifier, an anionic, cationic, nonionic or amphoteric surface active agent or a mixed type surface active agent, in the presence of a molecular weight modifier such as a sulfur-free hydrocarbon, for example, terpene type compound [e.g. dipentene, t-terpinene, α-terpinene, α-pinene, β-pinene, terpinolene (terpinolene is preferable)], mercaptan (e.g. t-dodecylmercaptan) or the like (the sulfur-free hydrocarbon is preferable); when the polymerization has reached a desired conversion, a terminator (e.g. N,N-diethylhydroxylamine) is added to the polymerization system to terminate the polymerization reaction; the unreacted monomers in the formed latex are removed by, for example, steam distillation; the resulting latex is mixed with an antioxidant (e.g. phenol derivative, amine derivative) and then subjected to coagulation by adding thereto an aqueous metal salt solution (e.g. aqueous aluminum sulfate solution, aqueous calcium chloride solution); the resulting aggregate of rubber particles is dried to obtain a copolymer rubber.

When a copolymer rubber is produced by the suspension radical polymerization, the polymerization is effected in an aqueous medium, using an oil-soluble radical initiator (e.g. azobisisobutyronitrile, benzoyl peroxide) and a dispersing agent (e.g. saponification product of polyvinyl alcohol); after the completion of the polymerization, water is removed from the polymerization system to obtain the copolymer rubber.

When a copolymer rubber is produced by the solution radical polymerization, there can be employed a generally known method as well.

The above polymerization in the production of the copolymer rubber can be effected by either continuous method or batchwise method.

The thus obtained copolymer rubber is subjected to hydrogenation of the double bonds of the conjugated diene unit according to an ordinary method, for example, the method described in Japanese Patent Application Kokoku No. 45-39275; Japanese Patent Application Kokai Nos. 52-32095 and 56-133291; etc., whereby the hydrogenated copolymer rubber of this invention can be obtained. This hydrogenation method specifically comprises hydrogenating the copolymer rubber in the presence of hydrogen of 1-100 atm. ordinarily using, as a catalyst, a dicyclopentadienyltitanium halide, a hydrogenation catalyst consisting of a cobalt organic carboxylate or a nickel organic carboxylate and an organometallic compound of a metal of group I, II or III of the Periodic Table, a metal catalyst consisting of nickel, platinum, palladium, ruthenium, rhenium or rhodium supported on carbon, silica, diatomaceous earth or the like, or a complex of cobalt, nickel, rhodium, palladium or ruthenium.

When a terpene type compound is used as a molecular weight modifier in the production of a copolymer rubber, the hydrogenation of the resulting copolymer rubber proceeds under mild conditions, i.e. the conditions where the catalyst level is significantly low as compared with the conventional case and, moreover, the resulting hydrogenated copolymer rubber provides a composition with good heat resistance.

The copolymer rubber is hydrogenated with the above-mentioned hydrogenation catalyst in at least one solvent selected from the group consisting of hydrocarbon solvents (e.g. hexane, heptane, cyclohexane, benzene, toluene, ethylbenzene), halogenated hydrocarbon solvents (e.g. chlorobenzene, dichlorobenzene) and polar solvents (e.g. methyl ethyl ketone, ethyl acetate, diethyl ether, tetrahydrofuran, acetone).

The thus obtained solution of the hydrogenated copolymer rubber is subjected to solvent removal by steam stripping or the like or to coagulation by an alcohol, followed by drying, whereby a solid hydrogenated copolymer rubber is obtained.

The Method (E) specifically includes, for example, a method comprising copolymerizing Monomer (A) and Monomer (B), hydrogenating at least 90% of the double bonds of the conjugated diene unit in the resulting copolymer in the same manner as employed in the Method (D), dissolving the resulting hydrogenated copolymer in a solvent, adding thereto Monomer (C) and, if necessary, a radical initiator such as mentioned above, and subjecting the hydrogenated copolymer and the Monomer (C) to addition reaction, and a method comprising adding a radical initiator and Monomer (C) to a hydrogenation product of a copolymer rubber of Monomer (A) and Monomer (B) being kneaded by a kneader (e.g. Banbury mixer, kneader) to thereby subject the hydrogenation product and the Monomer (C) to addition reaction. Any other known method, however, can be employed.

The hydrogenated copolymer rubber of this invention has, as a result of hydrogenation, improved heat resistance, ozone resistance, mechanical strengths, low-temperature resistance and impact resilience. In the hydrogenated copolymer rubber of this invention, it is necessary that at least 90%, preferably at least 95%, of the double bonds of the conjugated diene unit be hydrogenated (in other words, the amount of the unhydrogenated conjugated diene unit be less than 10%, preferably less than 5%). When the amount of hydrogenated double bonds is less than 90%, the resulting hydrogenated copolymer rubber has insufficient heat resistance and ozone resistance.

The copolymer rubber used in this invention has a polystyrene-reduced weight-average molecular weight of 30,000-5,000,000. When the molecular weight is less than 30,000, the resulting rubber composition has insufficient physical properties. When the molecular weight is more than 5,000,000, the composition has no sufficient processability.

The crosslinkable rubber composition of this invention can be obtained by mixing the hydrogenated copolymer rubber with a crosslinking agent.

As the crosslinking agent, there are used organic peroxides and sulfur-containing crosslinking agents (sulfur and compounds capable of releasing active sulfur by thermal dissociation). When the functional group-containing compound is used as the Monomer (C), there can also be used crosslinking compounds such as an ammonium organic carboxylates; a combination of an alkali metal organic carboxylate and a sulfur compound; organic amine compounds; and the like.

Of these, the organic peroxides and the sulfur-containing crosslinking agents are preferable because they give rise to a quick crosslinking reaction and require no secondary crosslinking. When a sulfur-containing crosslinking agent is used, in order to obtain a practically sufficient crosslinking density, it is necessary that in the hydrogenated copolymer rubber, at least 1 mole %, preferably at least 2 mole %, of the conjugated diene unit remain unhydrogenated.

As the organic peroxides and sulfur-containing crosslinking agent usable in this invention, there can be preferably used those employed in ordinary diene rubbers (e.g. styrene-butadiene rubber, isoprene rubber, acrylonitrile-butadiene rubber).

As the organic peroxides, there can be used, for example, 2,5-dimethyl-2,5-di(t-butylperoxy)hexyne, 2,5-dimethyl-2,5-di(t-butylperoxy)hexane, 1,3-bis(t-butylperoxyisopropyl)benzene, dicumyl peroxide, di-t-butyl peroxide, 1,1-di(t-butylperoxy)-3,3,5-trimethylcyclohexane and t-butyl peroxyisopropyl carbonate.

In order to achieve, in the crosslinking of the rubber component with the organic peroxide, reduction of crosslinking time, reduction of crosslinking temperature and property-improvement of crosslinked product, it is possible to use a bifunctional vinyl monomer or the like as a crosslinking aid. Such a crosslinking aid includes ethylene glycol dimethacrylate, 1,3-butanediol dimethacrylate, 1,4-butanediol dimethacrylate, 1,6-hexanediol dimethacrylate, polyethylene glycol dimethacrylate, 1,4-butanediol diacrylate, 1,6-hexanediol acrylate, 2,2'-bis(4-methacryloyldiethoxyphenyl)propane, trimethylolpropane trimethacrylate, trimethylolpropane triacrylate, pentaerythritol triacrylate, divinylbenzene, N,N'-methylenebisacrylamide, p-quinone dioxime, p,p'-dibenzoylquinone dioxime, triazine dithiol, triallyl cyanurate, triallyl isocyanurate, bismaleimide, silicone oil of high vinyl content, etc.

As the sulfur-containing crosslinking agent, there can be used, for example, a combination of sulfur and a crosslinking accelerator such as a thiazole (e.g. mercaptobenzothiazole), a guanidine (e.g. diphenylguanidine), a dithiocarbamic acid salt (e.g. zinc dithiocarbamate), a thiuram (e.g. tetramethylthiuram disulfide) or the like; a thiuram capable of releasing active sulfur by thermal dissociation such as tetramethylthiuram disulfide or the like; and a sulfur-containing organic compound such as 4,4-dithiobisdimorpholine or the like.

The crosslinking agent is used ordinarily in an amount of 0.1–10 parts by weight per 100 parts by weight of the hydrogenated copolymer rubber. When the amount is less than 0.1 part by weight, the crosslinking of the hydrogenated copolymer rubber hardly takes place. When the amount is more than 10 parts by weight, the resulting composition has insufficient processing stability, storage stability and physical properties.

The crosslinkable rubber composition of this invention can be prepared by adding to the hydrogenated copolymer rubber a crosslinking agent and, if necessary, other rubber component, various compounding agents ordinarily used, etc. and then mixing them by means of an ordinary mixer such as roll, Banbury mixer or the like.

The said other rubber component refers to a rubber co-crosslinkable with the hydrogenated copolymer rubber of this invention. As the co-crosslinkable rubber, there can be used, for example, at least one rubber selected from the group consisting of butyl rubber, polyisobutylene rubber, natural rubber, ethylene-propylene-diene copolymer rubber, styrene-butadiene copolymer rubber, acrylonitrile-butadiene copolymer rubber, acrylic rubber, isoprene rubber and fluororubber.

The co-crosslinkable rubber can be used in an amount of at least 5–200 parts by weight per 100 parts by weight of the hydrogenated copolymer rubber of this invention.

With respect to the compounding agents, there can be used, as the filler, carbon black and various white fillers such as silica, talc, clay, calcium carbonate, magnesium carbonate and the like. As the dispersing agent, there can be used, for example, metal salts or amides of higher fatty acids. As the plasticizer, there can be used, for example, phthalic acid derivatives, adipic acid derivatives and polyether esters. As the softener, there can be used lubricating oils, process oils and castor oil. As the antioxidant, there can be used, for example, amines [e.g. 4,4'-($\alpha,\alpha'$-dimethylbenzyl)diphenylamine], phenols [e.g. 2,2'-methylenebis(4-methyl-t-butylphenol)] and imidazoles. Besides, there can be used, if necessary, pigments, ultraviolet absorbers, flame retardants, crosslinking accelerators, foaming agents, scorch retarders, tackifiers, lubricants, etc.

The crosslinkable rubber composition of this invention is subjected to molding and crosslinking under the conditions ordinarily employed in the production of crosslinked rubber to be converted into a crosslinked product. That is, the crosslinkable rubber composition is molded and then subjected to primary crosslinking ordinarily at 100°–200° C. for several minutes to several hours at a pressure of 10–500 kg/cm$^2$ and, if necessary, further to secondary crosslinking at 100°–200° C. for 1–24 hours to obtain an oil-resistant crosslinked rubber product excellent in low-temperature resistance, ozone resistance, mechanical strengths, compression set and impact resilience.

The applications of the crosslinkable rubber composition of this invention are not particularly restricted. However, having the above mentioned properties, the crosslinkable rubber composition can be used in, for example, fuel system hoses of automobiles; other hoses, hose covers, diaphragms and sealing materials (e.g. gasket, O-ring, oil seal) of automobiles, which make contact with fuels, hydraulic oils, lubricating oils, etc.; and rolls, joint boots, strut suspension boots, timing belts, transmission belts and conveyor belts requiring oil resistance and solvent resistance, used in iron manufacture, spinning, printing, paper manufacture, dyeing, etc.

The thermoplastic polymer composition of this invention can be obtained by incorporating a thermoplastic resin into the hydrogenated copolymer rubber of this invention.

As the thermoplastic resin incorporated into the hydrogenated copolymer rubber, there can be used at least one resin selected from the group consisting of a polyolefin resin, a polyamide resin, a polyacetal resin, a polycarbonate resin, a polyphenylene oxide, a thermoplastic polyester resin, a (co)polymer resin of styrene or a styrene derivative, an acrylic resin, a polyarylate, a polysulfone, a polyether sulfone, a polyether imide and poly-4-methylpentene.

Of the above thermoplastic resins, the polyolefin resin is a crystalline olefin polymer obtained by subjecting an $\alpha$-olefin monomer such as ethylene, propylene, 1-butene or the like to homopolymerization or copolymerization.

The polyamide resin includes nylon 6, nylon 6/6, nylon 11, nylon 12, nylon 6/9, nylon 6/10, nylon 4/6, polyamide resins obtained by copolymerization of different monomers, and polyamide elastomers obtained by condensation reaction of a polyether and a polyamide.

The polyphenylene oxide includes modified polyphenylene oxides, too, obtained by incorporating a styrene resin into a polyphenylene oxide.

The thermoplastic polyester is preferably a polybutylene terephthalate.

The styrene resin is a homopolymer of an alkenyl aromatic compound, a copolymer of an alkenyl aromatic compound and other monomer copolymerizable therewith, a graft copolymer obtained by polymerizing an alkenyl aromatic compound or an alkenyl aromatic compound and other monomer copolymerizable therewith in the presence of a rubbery polymer, or a mixture of at least two of the above.

The alkenyl aromatic compound includes styrene, α-methylstyrene, p-methylstyrene, vinylxylene, chlorostyrene, bromostyrene, etc. These compounds can be used alone or in combination of two or more.

The above-mentioned other monomer includes alkenyl cyanide compounds such as acrylonitrile, methacrylonitrile and the like. These compounds can be used alone or in combination of two or more. Acrylonitrile is particularly preferable. The above-mentioned other monomer further includes alkyl acrylates such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate and octadecyl acrylate; acryl acrylates such as phenyl acrylate, benzyl acrylate and the like; alkoxyalkyl acrylates such as methoxyethyl acrylate, ethoxyethyl acrylate, ethoxypropyl acrylate and the like; alkyl methacrylates such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate and octadecyl methacrylate; aryl methacrylates such as phenyl methacrylate, benzyl methacrylate and the like; unsaturated acid anhydrides such as maleic anhydride, itaconic anhydride, citraconic anhydride and the like; unsaturated acids such as acrylic acid, methacrylic acid and the like; $\alpha,\beta$-unsaturated dicarboxylic acid imides such as maleimide, N-methylmaleimide, N-butylmaleimide, N-(p-methylphenyl)maleimide, N-phenylmaleimide, N-cyclohexylmaleimide and the like; and so forth. These compounds can be used alone or in combination of two or more in such an amount that the object of this invention is not impaired.

The rubbery polymer includes, for example, diene rubbers such as polybutadiene, polyisoprene, styrene-butadiene copolymer, acrylonitrile-butadiene copolymer and the like; and non-diene rubbers such as ethylene-propylene rubber, ethylene-butene rubber, ethylene-propylene-non-conjugated diene terpolymer, acrylic rubber and the like. These polymers can be used alone or in combination of two or more.

When the monomer component is a mixture of an alkenyl aromatic compound and other monomer copolymerizable therewith, the proportion of the alkenyl aromatic compound in the mixture is preferably 50% by weight or more, more preferably 70% by weight or more. When the proportion is within said range, the resulting thermoplastic polymer composition has higher moldability and gives a molded article of better surface appearance.

The acrylic resin includes a homopolymer of an alkyl (meth)acrylate, a copolymer of an alkyl (meth)acrylate and other monomer copolymerizable therewith, a graft copolymer obtained by polymerizing an alkyl (meth)acrylate or an alkyl (meth)acrylate and other monomer copolymerizable therewith in the presence of a rubbery polymer, and a mixture of at least two of the above homopolymer, copolymer and graft copolymer.

The alkyl (meth)acrylate includes, for example, methyl acrylate, ethyl acrylate, methyl methacrylate and ethyl methacrylate. Methyl methacrylate is preferable.

As the above-mentioned copolymerizable monomer, there can be used those copolymerizable monomers as mentioned as to the styrene resin but excluding alkyl acrylates and alkyl methacrylates. As the rubbery polymer, there can be used those rubbery polymers as mentioned as to the styrene resin.

When the monomer component is a mixture of an alkyl (meth)acrylate and other monomer copolymerizable therewith, the proportion of the alkyl (meth)acrylate in the mixture is preferably at least 55% by weight, more preferably at least 70% by weight. When the proportion is within this range, the resulting thermoplastic polymer composition has higher weather resistance.

Of the above thermoplastic resins, preferable is at least one resin selected from the group consisting of a polyamide resin, a polyacetal resin, a polycarbonate resin, a polyphenylene oxide, a thermoplastic polyester resin, a styrene resin and an acrylic resin. These resins give a thermoplastic polymer composition of this invention which is more improved in heat resistance, low-temperature resistance, oil resistance and compression set.

The proportions of the hydrogenated copolymer rubber and the thermoplastic resin in the thermoplastic polymer composition of this invention are 1-80 parts by weight, preferably 5-60 parts by weight of the hydrogenated copolymer rubber and 99-20 parts by weight, preferably 95-40 parts by weight of the thermoplastic resin. When the proportion of the hydrogenated copolymer resin is less than 1 part by weight, the resulting composition has no improvement in impact resistance. When the proportion is more than 80 parts by weight, the composition has poor processability.

In order for the thermoplastic polymer composition to exhibit meritorious effects intended by this invention, it is preferable to control the mixing temperature to a temperature not lower than the melting point of the thermoplastic resin component. When the mixing temperature is lower than the melting point of the thermoplastic resin, not only a higher torque is required in mixing but also mixing becomes insufficient, making it impossible for the resulting composition to exhibit the properties fully.

Conversely when the mixing temperature is too high, the soft component of the hydrogenated copolymer rubber causes thermal degradation, etc., making it impossible to obtain a composition of desired properties.

Therefore, the mixing temperature is preferably at least 5° C. higher, more preferably 10°-100° C. higher than the melting point of the thermoplastic resin.

The method of mixing the hydrogenated copolymer rubber with the thermoplastic resin is not critical. There can be used known means such as open mixing roll, closed type Banbury mixer, kneader, continuous mixer and the like.

The thermoplastic polymer composition of this invention can contain fillers (e.g. calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, carbon fiber, glass fiber) and coloring agents (e.g. carbon black, ultramarine blue, titanium oxide, zinc white, red iron oxide, Prussian blue, azo pigment, nitroso pigment, lake pigment, phthalocyanine pigment) in such amounts that the moldability and mechanical strengths are not impaired.

The thermoplastic polymer composition of this invention can further contain a mineral oil type softener for rubber (so-called process oil or extender oil), a plasticizer (e.g. dioctyl phthalate, dibutyl phthalate, diethyl phthalate, dimethyl phthalate, tricresyl phosphate, triethyl phosphate, tributyl phosphate, tri-2-ethylhexyl phosphate, trimellitic acid ester, dioctyl adipate, dioctyl azelate, dioctyl sebacate, epoxy fatty acid ester), a liquid rubber (e.g. liquid NBR, liquid acrylic rubber, liquid polybutadiene rubber) and a plasticizer for nylon [e.g. benzenesulfonbutylamide, POBO (a product of Yoshitomi Pharmaceutical Industries, Ltd.), Sansocizer N400 (a product of New Japan Chemical Co., Ltd.)] in such amounts that the mechanical strengths are not impaired, whereby the thermoplastic polymer composition can have improved fluidity.

It is also possible to incorporate, into the thermoplastic polymer composition during mixing, a phenylenediamine type antioxidant (e.g. NOCRAC CD, NOCRAC TD, NOCRAC GI, NOCRAC WHITE; all are products of Ohuchi Shinko Chemical Industrial Co., Ltd.), an imidazole type antioxidant (e.g. NOCRAC MB, NOCRAC MMB; both are products of Ohuchi Shinko Chemical Industrial Co., Ltd.) and a hindered phenol type antioxidant (e.g. NOCRAC 200, NOCRAC 300; both are products of Ohuchi Shinko Chemical Industrial Co., Ltd.).

The thermoplastic polymer composition of this invention can also be used in the form of a mixture with other resin or an elastomer.

The thermoplastic polymer composition of this invention can be used in various applications, for example, automobile parts (e.g. body panel, bumper part, molded side shield, steering wheel, joint boot, strut suspension boot, handle, timing belt); footwear (e.g. shoe sole, sandal); electric parts (e.g. cladding of electric wire, connector, cap plug, gear); grips for golf club, baseball bat, automobile and motorbicycle; parts for leisure goods (e.g. swimming fin, underwater mask); gaskets; waterproof cloth; hydraulic system hoses; fuel hoses; Freon hoses; power steering hoses; hose covers; coil tubes; packings; rolls; garden hoses; belts; and vibration-damping material for vibration-damping steel plate. Preferable applications are joint boot, strut suspension boot, hose cover and timing belt.

The hydrogenated copolymer rubber of this invention is superior in impact resistance, heat resistance and mechanical strengths because the content of the double bonds of the conjugated diene unit is significantly reduced by hydrogenation.

The crosslinkable rubber composition of this invention, when crosslinked, gives a highly durable oil-resistant crosslinked rubber product superior in low-temperature resistance, heat resistance, ozone resistance, mechanical strengths, compression set and impact resilience.

Because of these superior properties, the crosslinkable rubber composition of this invention can be preferably used in O-rings, packings, boots, belts, etc.

The thermoplastic polymer composition of this invention consisting of the hydrogenated copolymer rubber of this invention and a thermoplastic resin can exhibit improved impact resistance in a small amount of the rubber component while retaining the excellent properties of the thermoplastic resin, and can be provided as soft to hard resin compositions by appropriately changing the proportions and types of the components, and accordingly has a very high industrial value.

This invention is described more specifically below referring to Examples. However, this invention is not restricted to these Examples.

In the Examples, parts and % are by weight unless otherwise specified.

In the Examples, the properties of the crosslinked rubbers obtained were measured in accordance with JIS K 6301.

EXAMPLES 1-11 AND COMPARATIVE EXAMPLES 1-6

Preparation of Copolymer Rubbers and Hydrogenated Copolymer Rubbers

Into an iron vessel purged with nitrogen were charged 100 parts of a mixture of the monomers indicated in the composition of hydrogenated copolymer rubber of Table 1, 200 parts of water, 3 parts of sodium laurylsulfate, 0.2 part of p-menthane hydroperoxide, 0.125 part of sodium ethylenediaminetetraacetate, 0.05 part of ferrous sulfate, 0.2 part of sodium formaldehyde sulfoxylate and 0.2 part of t-dodecylmercaptan. They were subjected to polymerization at 10° C. for 1-10 hours.

After the completion of the polymerization, the reaction mixture was taken out and steam was blown into the mixture to remove the unreacted monomers. To the resulting copolymer latex was added an aqueous calcium chloride solution to coagulate the latex. The crumbs were washed with water sufficiently and dried at about 90° C. for 1-3 hours to obtain each copolymer rubber.

10 parts of the copolymer rubber was dissolved in 90 parts of toluene. The resulting solution was placed in a pressure vessel. Thereto were added, as a catalyst, 0.5 part of nickel naphthenate and 0.15 part of triethylaluminum. The contents in the vessel were placed under a hydrogen pressure of 40 kg/cm$^2$.G at 60° C. for 1-5 hours to hydrogenate the carbon-carbon double bonds of the conjugated diene unit in the copolymer rubber, thereby to obtain a hydrogenated copolymer rubber.

Exceptionally in the case of the hydrogenated copolymer rubber L, there was used, as a hydrogenation catalyst, triphenylphosphinerhodium chloride [C$_6$H$_5$)$_3$P]$_3$RhCl.

The composition of each hydrogenated copolymer rubber obtained is shown in Table 1. The content of unhydrogenated butadiene in the hydrogenated copolymer rubber, shown in Table 1 was determined by measuring the iodine value of the rubber.

The weight-average molecular weight of the hydrogenated copolymer rubber, also shown in Table 1, is a polystyrene-reduced value obtained by gel permeation chromatography.

Figure 1:
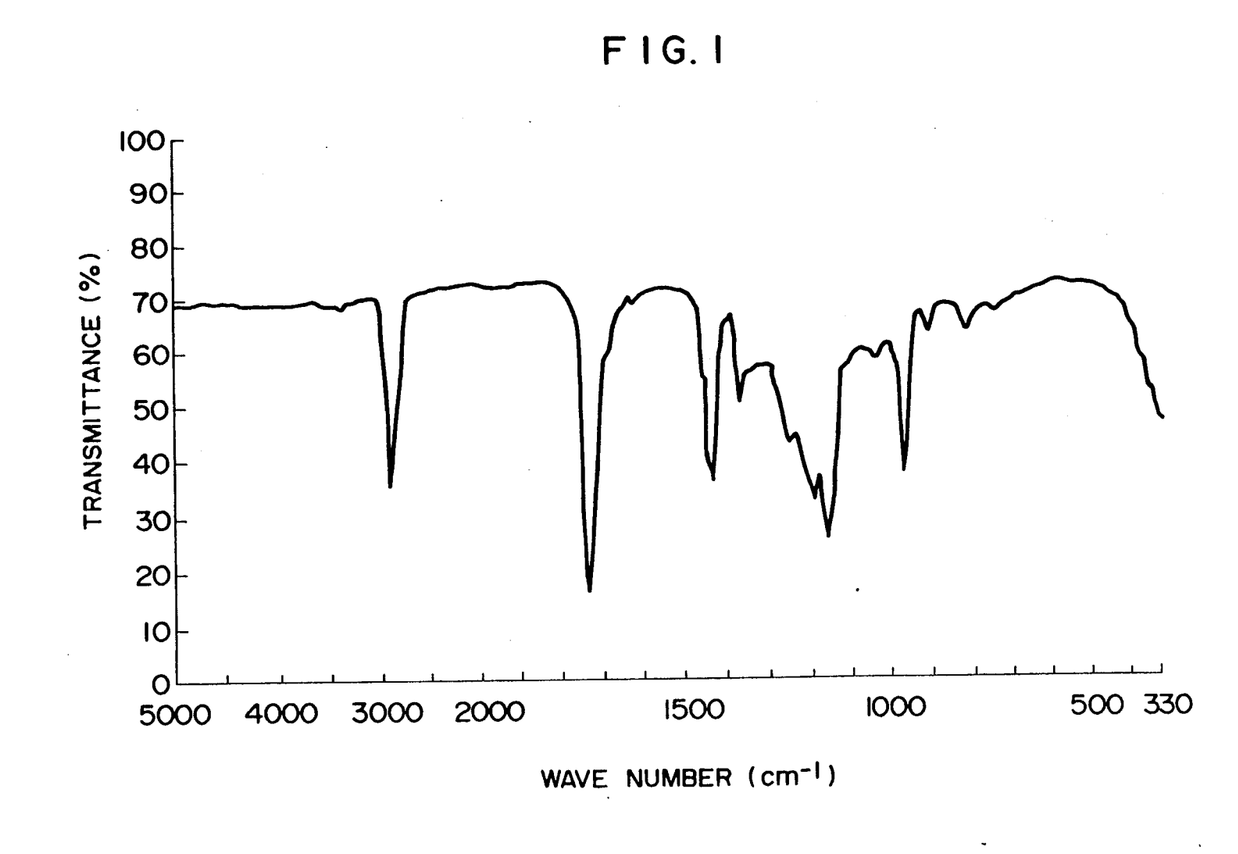
FIG. 1 is an infrared absorption spectrum of Copolymer Rubber A in Examples 1-11 before hydrogenation.
Figure 2:
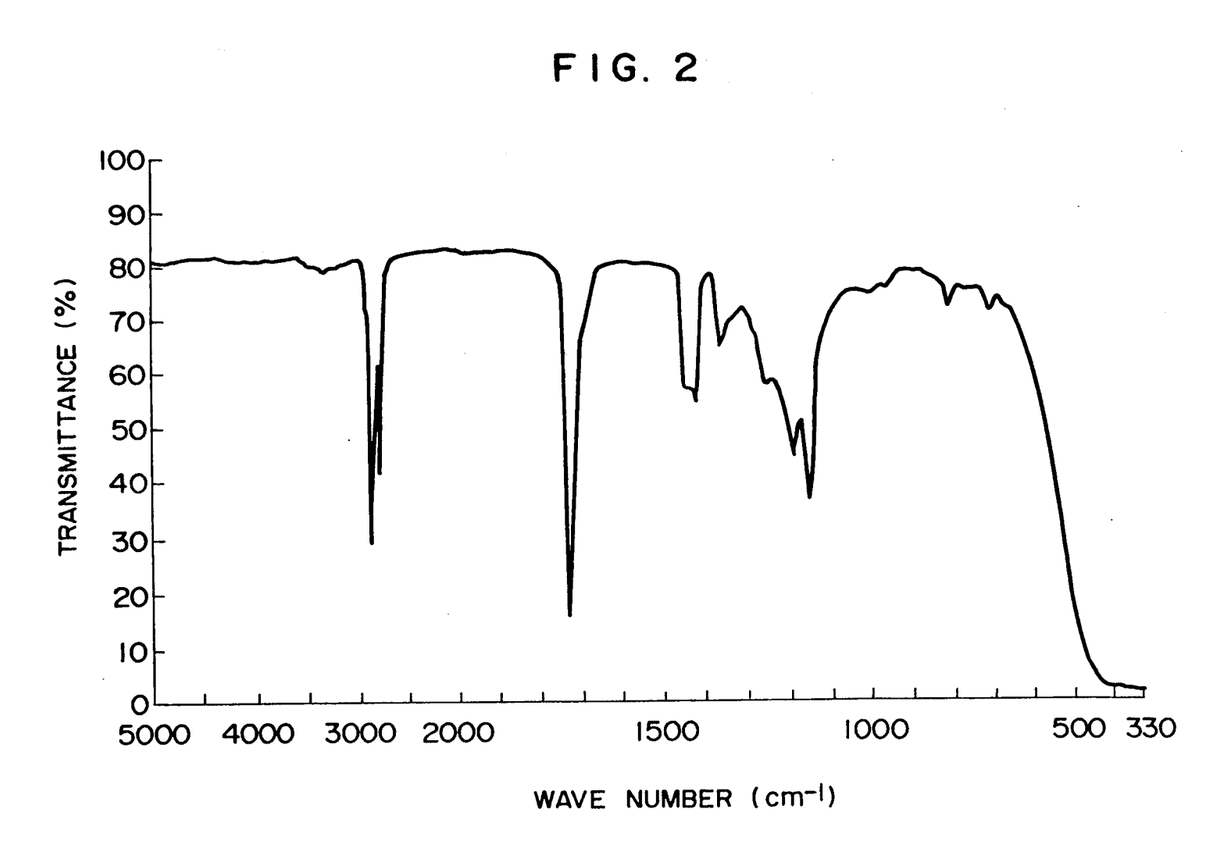
FIG. 2 is an infrared absorption spectrum of Copolymer Rubber A in Examples 1-11 after hydrogenation.

The infrared absorption spectra of the Copolymer Rubber A before hydrogenation and the Copolymer Rubber A after hydrogenation are shown in FIGS. 1 and 2, respectively. As is clear from FIGS. 1 and 2, there is seen, at 1760 cm$^{-1}$, a characteristic absorption due to the C=O bond of ester, and the characteristic absorption at 970 cm$^{-1}$ due to the trans configuration of polybutadiene is reduced by hydrogenation. This indicates that the copolymer is a butadiene-methyl acrylate copolymer.

As is clear from Table 3, the crosslinkable rubber compositions of this invention give highly durable oil-resistant crosslinked rubber products superior in low-temperature resistance, heat resistance, ozone resistance, mechanical strengths, compression set and impact resilience.

In contrast, the crosslinked rubber products obtained from the crosslinkable rubber compositions not satisfying the requirements of this invention, are poorly balanced in low-temperature resistance, heat resistance, ozone resistance, mechanical strengths, compression set and impact resilience.

Preparation of Crosslinkable Rubber Compositions and Crosslinked Rubber Products Each of the above hydrogenated copolymer rubbers was kneaded by a roll according to the compounding recipe shown in Table 2 to obtain each crosslinkable rubber composition.

An uncrosslinked rubber sheet was prepared from the crosslinkable rubber composition. The sheet was crosslinked at 170° C. for 20 minutes using a vulcanizing press. The physical properties of each resulting crosslinked rubber product were measured in accordance with JIS K 6301. The results are shown in Table 3.

TABLE 1

| Hydrogenated copolymer rubber | A | B | C | D | E | F | G | H | I | J | K | L | M | N |
|---|---|---|---|---|---|---|---|---|---|---|---|---|---|---|
| Composition of hydrogenated copolymer rubber (mole %) | | | | | | | | | | | | | | |
| Methyl acrylate | 50 | — | — | — | — | — | — | — | — | — | — | — | — | — |
| Ethyl acrylate | — | 50 | — | 25 | 33 | 67 | 48 | 48 | 50 | 12 | 83 | 38 | 50 | 50 |
| n-Butyl acrylate | — | — | 50 | — | — | — | — | — | — | — | — | — | — | — |
| 2-Methoxyethyl acrylate | — | — | — | 25 | — | — | — | — | — | — | — | — | — | — |
| 1,3-Butadiene | 50 | 50 | 50 | 50 | 67 | 33 | 48 | 48 | — | 88 | 17 | 42 | 50 | 50 |
| Isoprene | — | — | — | — | — | — | — | — | 50 | — | — | — | — | — |
| Styrene | — | — | — | — | — | — | 4 | — | — | — | — | — | — | — |
| Methyl methacrylate | — | — | — | — | — | — | — | 4 | — | — | — | — | — | — |
| Acrylonitrile | — | — | — | — | — | — | — | — | — | — | — | 20 | — | — |
| Content of unhydrogenated butadiene (%) | 2.5 | 3.6 | 2.5 | 4.1 | 3.3 | 2.4 | 3.3 | 2.4 | 2.5 | 5.5 | 8.5 | 19.7 | 50.0 | 25.0 |
| Weight-average molecular weight ($\times 10^4$) | 159 | 123 | 105 | 112 | 162 | 147 | 134 | 120 | 111 | 172 | 105 | 148 | 155 | 162 |

TABLE 2

| No. of compounding recipe | I | II | III | IV |
|---|---|---|---|---|
| Compounding recipe (parts) | | | | |
| Hydrogenated copolymer rubber or commerically available polymer | 100 | 100 | 100 | 100 |
| Carbon black (FEF) | 50 | 50 | 50 | — |
| Carbon black (SRF) | — | — | — | 60 |
| Stearic acid | 1 | 1 | 1 | 1 |
| Naphthenic oil (2050N) | — | — | — | 10 |
| NOCRAC CD*1 | 1 | 1 | — | — |
| MgO #150 | — | — | — | 4 |
| ZnO #1 | — | — | 5 | 5 |
| PERKADOX 14/40*2 | 2.5 | — | — | — |
| KAYAHEXA AD-40*3 | — | 1 | — | — |
| ACCEL 22*4 | — | — | — | 0.5 |
| VULNOC PM*5 | 2.5 | — | — | — |
| TAIC*6 | — | 5 | — | — |
| Tetramethylthiuram disulfide | — | — | 1.5 | — |
| Tetraethylthiuram disulfide | — | — | 1.0 | — |
| Mercaptobenzothiazole | — | — | 0.5 | — |

*1 4,4'-(α,α-Dimethylbenzyl)diphenylamine, a product of Ohuchi Shinko Chemical Industrial Co., Ltd.
*2 1,3-Bis(t-butylperoxyisopropyl)benzene, a product of Kayaku Noury Co., Ltd.
*3 2,5-Dimethyl-2,5-di(t-butylperoxy)hexane, a product of Kayaku Noury Co., Ltd.
*4 Ethylenethiourea, a product of Kawaguchi Kagaku K.K.
*5 N,N'-m-phenylenedimaleimide, a product of Ohuchi Shinko Chemical Industrial Co., Ltd.
*6 Triallyl isocyanurate, a product of NIPPON CHEMICAL CO., LTD.

TABLE 3

| | Example 1 | Example 2 | Example 3 | Example 4 | Example 5 | Example 6 | Example 7 | Example 8 | Example 9 |
|---|---|---|---|---|---|---|---|---|---|
| Hydrogenated copolymer rubber | A | B | C | D | E | F | G | H | I |
| No. of compounding recipe | I | I | I | I | I | I | I | I | I |
| Properties of crosslinked product | | | | | | | | | |
| Tensile strength (kg · f/cm$^2$) | 193 | 170 | 140 | 145 | 225 | 165 | 195 | 180 | 168 |
| Elongation (%) | 230 | 260 | 300 | 220 | 200 | 245 | 250 | 230 | 290 |
| Hardness (JIS A) | 70 | 65 | 60 | 61 | 73 | 63 | 69 | 70 | 66 |
| Heat resistance (175° C. × 70 hours, heating by air) | | | | | | | | | |
| Change of tensile strength (%) | −16 | −18 | −20 | −35 | −31 | −13 | −20 | −23 | −22 |
| Change of elongation (%) | −26 | −25 | −29 | −40 | −41 | −21 | −31 | −30 | −30 |
| Change of hardness (point) | +7 | +8 | +10 | +13 | +11 | +6 | +8 | +7 | +9 |
| Low-temperature torsion test (Gehman) | | | | | | | | | |
| $T_{10}$ (°C.) | −34 | −42 | −55 | −49 | −45 | −35 | −38 | −37 | −44 |
| Compression set (150° C. × 70 hours, 25% compression) | | | | | | | | | |
| Cs (%) | 24 | 22 | 25 | 28 | 20 | 27 | 28 | 29 | 23 |
| Impact resilience | | | | | | | | | |
| Re (%) | 46 | 50 | 48 | 49 | 52 | 45 | 44 | 43 | 51 |
| Ozone deterioration test (50 pphm, 40° C., dynamic 0–20%) | | | | | | | | | |
| Time to first appearance of cracking | No cracking for 168 | Same as left | Same as left | Same as left | Same as left | Same as left | No cracking for 168 | Same as left | Same as left |

TABLE 3-continued

| | | Example 10 | Example 11 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Oil resistance (JIS #3 oil, 150° C. × 170 hours) | | | | | | | | | |
| Volume change (%) | | 67 | 89 | 132 | 60 | 131 | 49 | 91 | 89 | 125 |

| | | Example 10 | Example 11 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Hydrogenated copolymer rubber | | A | A | J | K | L | M | N | M |
| No. of compounding recipe | | II | III | I | I | I | I | I | III |
| Properties of crosslinked product | | | | | | | | | |
| Tensile strength (kg · f/cm²) | | 178 | 186 | 150 | 100 | 220 | 162 | 165 | 185 |
| Elongation (%) | | 290 | 480 | 50 | 100 | 255 | 60 | 100 | 250 |
| Hardness (JIS A) | | 64 | 72 | 67 | 69 | 77 | 87 | 83 | 70 |
| Heat resistance (175° C. × 70 hours, heating by air) | | | | | | | | | |
| Change of tensile strength (%) | | −15 | −33 | −27 | −25 | −28 | −70 | −45 | −50 |
| Change of elongation (%) | | −24 | −80 | −35 | −40 | −61 | −100 | −76 | −100 |
| Change of hardness (point) | | +7 | +15 | +6 | +5 | +10 | +7 | +5 | +25 |
| Low-temperature torsion test (Gehman) | | | | | | | | | |
| $T_{10}$ (°C.) | | −35 | −34 | −17 | −20 | −25 | −18 | −20 | −24 |
| Compression set (150° C. × 70 hours, 25% compression) | | | | | | | | | |
| Cs (%) | | 25 | 65 | 19 | 20 | 67 | 20 | 24 | 32 |
| Impact resilience | | | | | | | | | |
| Re (%) | | 48 | 48 | 30 | 12 | 30 | 15 | 20 | 30 |
| Ozone deterioration test (50 pphm, 40° C., dynamic 0–20%) | | | | | | | | | |
| Time to first appearance of cracking | | Same as left | Same as left | No cracking for 168 hours | Same as left | 24 hours | 24 hours | 24 hours | 24 hours |
| Oil resistance (JIS #3 oil, 150° C. × 170 hours) | | | | | | | | | |
| Volume change (%) | | 69 | 70 | 208 | 39 | 30 | 45 | 55 | 47 |

EXAMPLE 12 AND COMPARATIVE EXAMPLES 7-8

Crosslinkable rubber compositions were prepared in the same manner as in Example 1, except that there was used, as the rubber component, a hydrogenated copolymer rubber, a chloroprene rubber or a hydrogenated acrylonitrile-butadiene rubber (hydrogenated NBR) all shown in Table 4. Crosslinked rubber products were prepared from the compositions in the same manner as in Example 1, and were measured for physical properties. The results are shown in Table 4.

As is clear from Table 4, the crosslinkable rubber composition of this invention, as compared with the chloroprene rubber, is significantly superior in heat resistance, ozone resistance and compression set and also superior in low-temperature resistance.

The hydrogenated copolymer rubber of this invention, as compared with the hydrogenated acrylonitrile-butadiene rubber, is significantly superior in low-temperature resistance and also superior in heat resistance, ozone resistance and impact resilience.

TABLE 4

| | Example 12 | Comparative Example 7 | Comparative Example 8 |
|---|---|---|---|
| Hydrogenated copolymer rubber*1 (parts) | 100 | — | — |
| Chloroprene rubber*2 (parts) | — | 100 | — |
| Hydrogenated NBR*3 (parts) | — | — | 100 |
| No. of compounding recipe | I | IV | I |
| Properties of crosslinked product | | | |
| Tensile strength (kg · f/cm²) | 170 | 209 | 253 |
| Elongation (%) | 260 | 190 | 230 |
| Hardness (JIS A) | 65 | 76 | 77 |
| Heat resistance (175° C. × 70 hours, heating by air) | | | |
| Change of tensile strength (%) | −26 | −74 | −42 |
| Change of elongation (%) | −10 | −100 | −69 |
| Change of hardness (point) | +3 | +20 | +8 |
| Low-temperature torsion test (Gehman) | | | |
| $T_{10}$ (°C.) | −42 | −36 | −26 |
| Compression set (150° C. × 70 hours, 25% compression) | | | |
| Cs (%) | 20 | 65 | 20 |
| Impact resilience | | | |
| Re (%) | 48 | 53 | 39 |
| Ozone deterioration test (50 pphm, 40° C., dynamic 0–20%) | | | |
| Time to first appearance of cracking | No cracking for 168 hours | 24 hours | 48 hours |

*1Ethyl acrylate/butadiene (molar ratio) = 55/45, amount of unhydrogenated butadiene = 3.6 mole %
*2Neoprene-W, a product of DENKI KAGAKU KOGYO K.K.
*3ZETPOL 2020, a product of Nippon Zeon Co., Ltd.

EXAMPLES 13-16 AND COMPARATIVE EXAMPLE 9

Polymerization was effected at 10° C. in a 6-liter autoclave according to the following polymerization recipe:

| Polymerization recipe | Parts |
| --- | --- |
| Mixture of the monomers indicated in the composition of copolymer rubber of Table 5 | 100 |
| Water | 200 |
| Sodium laurylsulfate | 3 |
| Ferrous sulfate | 0.05 |
| Sodium formaldehyde sulfoxylate | 0.2 |
| Sodium ethylenediaminetetraacetate | 0.125 |
| Paramenthane hydroperoxide | 0.2 |
| Terpinolene | 0.65 |

0.2 part of N,N-diethylhydroxyamine was added per 100 parts of the monomers to terminate the polymerization.

The reaction mixture was subjected to steam distillation to remove the unreacted monomers. The resulting latex was coagulated with an aqueous calcium chloride solution. The resulting crumbs were washed with water and dried at about 90° C. for 1-3 hours to obtain a copolymer rubber.

10 parts of the copolymer rubber was dissolved in 90 parts of toluene. The resulting solution was placed in a pressure vessel. Thereto were added, as a catalyst, 0.5 part of nickel naphthenate and 0.15 part of triethylaluminum. The contents in the vessel were subjected to a hydrogen pressure of 40 kg/cm$^2$.G at 60° C. for 5 hours to hydrogenate the carbon-carbon double bonds of the conjugated diene unit in the copolymer rubber to obtain a hydrogenated copolymer rubber.

The content of unhydrogenated butadiene in the hydrogenated copolymer rubber was determined by measuring the iodine value of the rubber. The results are shown in Table 5.

Figure 3:
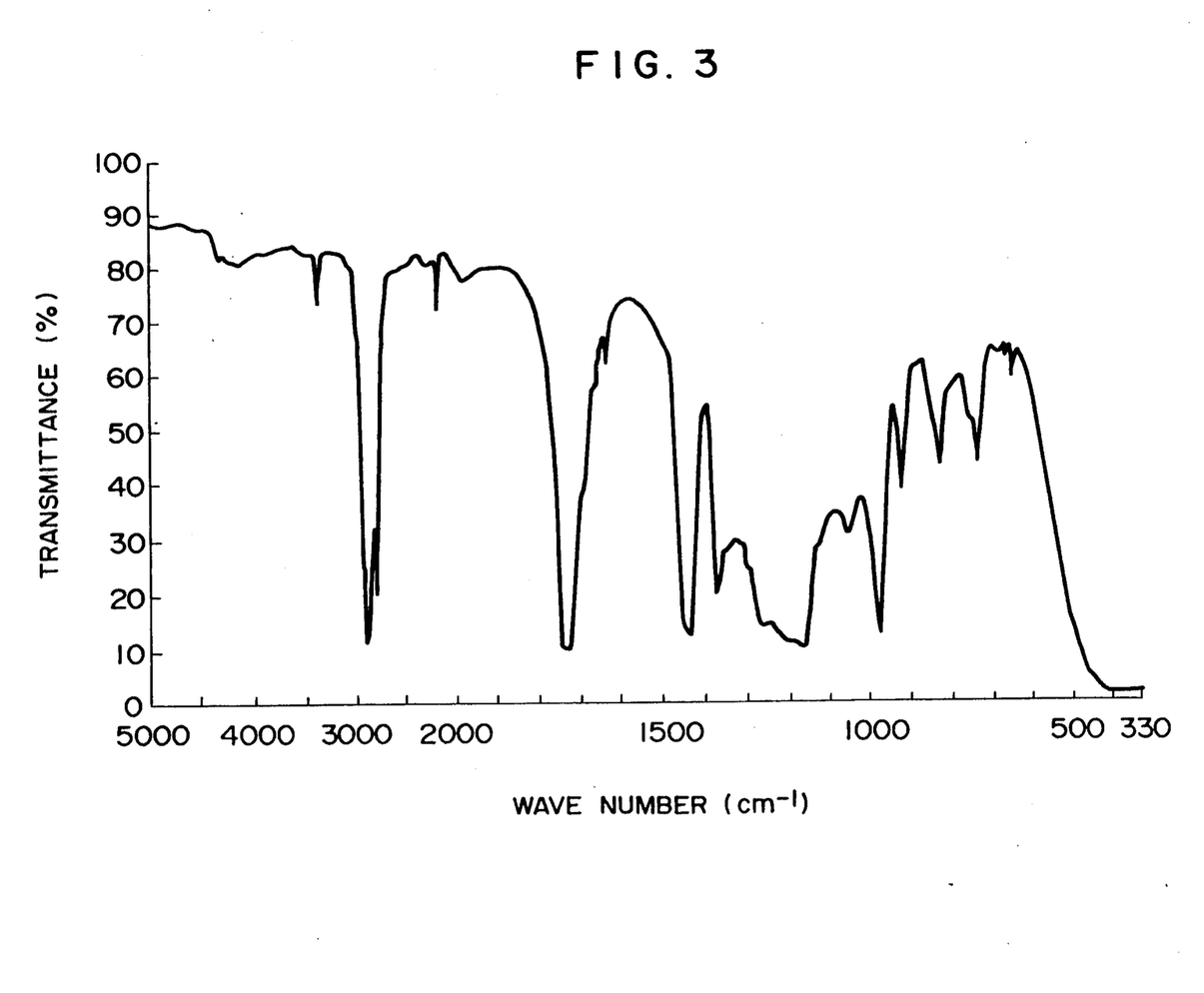
FIG. 3 is an infrared absorption spectrum of the copolymer rubber in Example 14 before hydrogenation.
Figure 4:
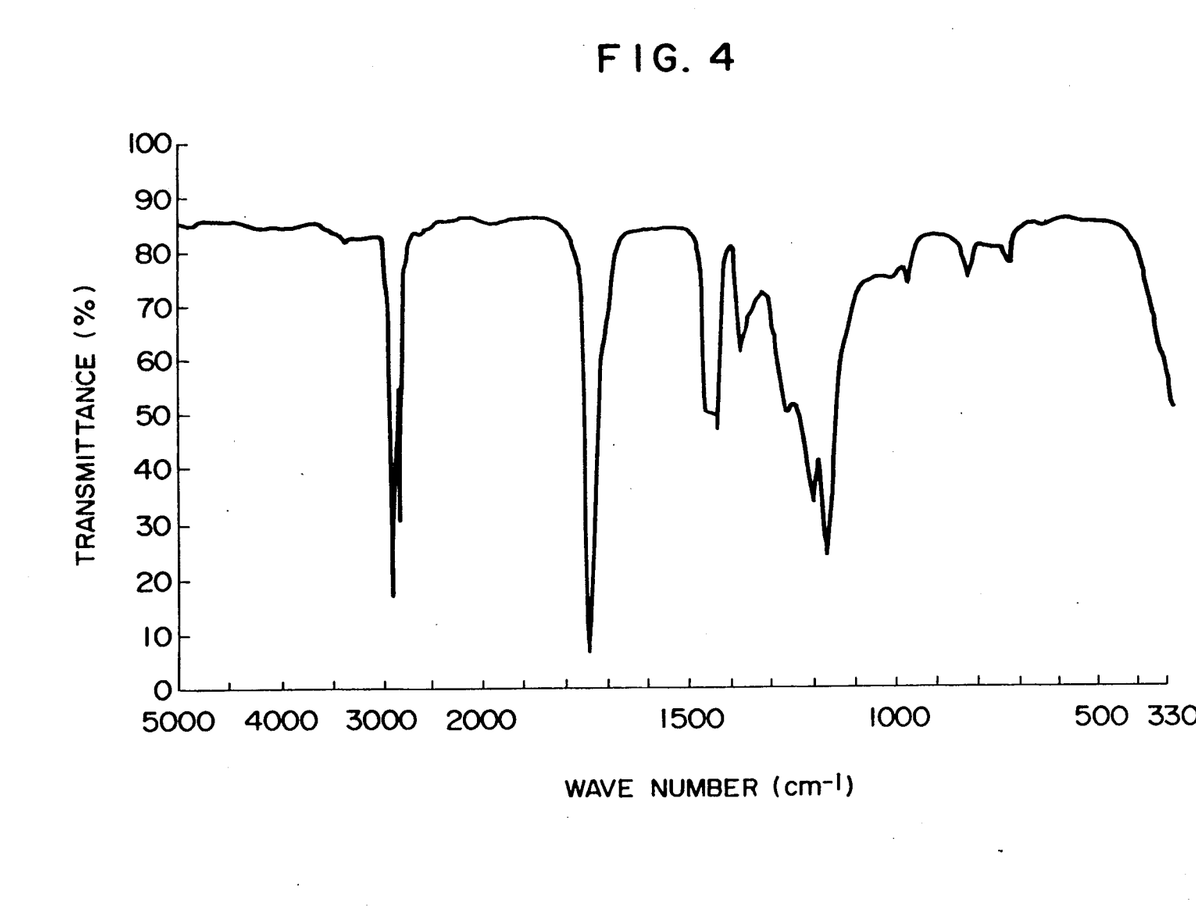
FIG. 4 is an infrared absorption spectrum of the copolymer rubber in Example 14 after hydrogenation.

The weight-average molecular weight of the hydrogenated copolymer rubber shown in Table 5 is a polystyrene-reduced value measured by gel permeation chromatography.

due to the trans configuration of polybutadiene is reduced by hydrogenation. Further, in the copolymer rubber of Example 14, it was possible to determine the carboxyl group by alkali titration. These indicate that the copolymer rubber is a butadiene-methyl acrylate-acrylic acid copolymer.

EXAMPLES 17-20 AND COMPARATIVE EXAMPLE 10

Preparation of Crosslinkable Rubber Compositions and Adhesion Test

Each of the hydrogenated copolymer rubbers obtained in Examples 13-16 and Comparative Example 9 was kneaded by a roll according to the compounding recipe shown in Table 6, to obtain a crosslinkable rubber composition.

A sheet was prepared from the crosslinkable rubber composition. On the sheet was placed a polyester film or an aluminum plate (thickness: 0.05 mm). They were pressed by a vulcanizing press at 170° C. for 20 minutes to effect the crosslinking of the sheet.

Then, the laminate of the crosslinked sheet and the polyester film or the aluminum plate was cut into strips of 2 cm in width. The strips were used for measurement of peeling strength in accordance with JIS K 6301. The results are shown in Table 7.

As is clear from Table 7, the crosslinkable rubber compositions comprising a hydrogenated copolymer rubber of this invention are superior in adhesion.

TABLE 6

| Compounding recipe | Parts |
| --- | --- |
| Hydrogenated copolymer rubber | 100 |
| Carbon black (FEF) | 50 |
| Stearic acid | 1 |
| NOCRAC CD[*1] | 1 |
| PERKADOX 14/40[*2] | 2.5 |
| VULNOC PM[*3] | 2.5 |

[*1]4,4'-(α,α-Dimethylbenzyl)diphenylamine, a product of Ohuchi Shinko Chemical Industrial Co., Ltd.
[*2]1,3-Bis(t-butylperoxyisopropyl)benzene, a product of Kayaku Noury Co., Ltd.
[*3]N,N'-m-phenylenedimaleimide, a product of Ohuchi Shinko Chemical Industrial Co., Ltd.

TABLE 5

|  | Example 13 | Example 14 | Example 15 | Example 16 | Comparative Example 9 |
| --- | --- | --- | --- | --- | --- |
| Composition of copolymer rubber (mole %)[*1] |  |  |  |  |  |
| Component (A) |  |  |  |  |  |
| Methyl acrylate | 50 | 44 | 45 | 44 | 50 |
| Component (B) |  |  |  |  |  |
| 1,3-Butadiene | 49.6 | 52 | 52 | 54 | 50 |
| Component (C) |  |  |  |  |  |
| Acrylic acid | 0.4 | 4 | — | — | — |
| Hydroxyethyl methacrylate | — | — | 3 | — | — |
| Diethylaminoethyl acrylate | — | — | — | 2 | — |
| Content of unhydrogenated butadiene (mole %)[*2] | 2.5 | 2.6 | 2.5 | 2.7 | 2.5 |
| Weight-average molecular weight (× 10$^4$) | 162 | 172 | 147 | 140 | 158 |

[*1]Examined by, after emulsion polymerization, analyzing the residual monomers by gas chromatography and measuring the iodine value of the copolymer obtained.
[*2]Measured by the iodine value method.

The infrared absorption spectra of the copolymer rubber before and after hydrogenation in Example 14 are shown in FIGS. 3 and 4, respectively.

As is clear from FIGS. 3 and 4, there is seen, at 1740 cm$^{-1}$, a characteristic absorption due to the C=O bond of ester, and the characteristic absorption at 970 cm$^{-1}$

TABLE 7

| | Type of hydrogenated copolymer rubber used | Peeling strength to polyester film, $T_F$ (kg · f/cm) | Peeling strength to aluminum plate, $T_F$ (kg · f/cm) |
|---|---|---|---|
| Example 17 | Polymer of Example 13 | 0.65 | 3.10 |
| Example 18 | Polymer of Example 14 | 0.71 | 3.50 |
| Example 19 | Polymer of Example 15 | 0.61 | 2.31 |
| Example 20 | Polymer of Example 16 | 0.68 | 3.42 |
| Comparative Example 10 | Polymer of Comparative Example 9 | 0.40 | 0[*1] |

[*1]Delamination occurred at the time of sample preparation.

EXAMPLE 21

100 parts of the hydrogenated copolymer rubber prepared in Comparative Example 9 was placed in a Haake rheometer (a kneader) and kneaded at 190° C. for 5 minutes. Thereto was added 5 parts of maleic anhydride, and kneading was effected for 2 minutes. Thereafter, 0.1 parts of 2,5-dimethyl-2,5-di(t-butylperoxy)-hexane was added, and kneading was effected for 5 minutes. The resulting mixture was taken out.

The mixture was dissolved in toluene. The solution was coagulated with n-hexane. Unreacted maleic anhydride was removed and the resulting crumbs were dried to obtain a maleic anhydride-modified hydrogenated copolymer rubber.

The maleic anhydride-modified hydrogenated copolymer rubber was kneaded according to the compounding recipe of Table 6. Then, peeling test was effected in the same manner as in Example 17. The results are shown in Table 8.

As is clear from Table 8, the crosslinkable rubber composition comprising a hydrogenated copolymer rubber of this invention is superior in adhesion.

TABLE 8

| | Type of hydrogenated copolymer rubber used | Peeling strength to polyester film, $T_F$ (kgf/cm) | Peeling strength to aluminum plate, $T_F$ (kgf/cm) |
|---|---|---|---|
| Example 21 | Polymer obtained by reacting Comparative Example 9 polymer with maleic anhydride | 0.67 | 3.02 |

EXAMPLES 22–31 AND COMPARATIVE EXAMPLES 11–21

One of the hydrogenated copolymer rubbers of Examples 13–16 and Comparative EXAMPLE 9 shown in Table 5 was mixed with one of the thermoplastic resins shown in Table 9, in the proportions shown in Table 9, at 280° C. for 5 minutes using a small-sized extruder (Rheomex 254, a product of Haake Co.). The resulting mixture was pelletized. The pellets were dried and molded into a test piece for Izod impact test by JIS K 7110 and a test piece for flexural strength test by JIS K 7203, using a 0.5-ounce injection molding machine.

Izod impact test was effected after having been notched ¼". This test was effected also for the test piece which had been subjected to a heat deterioration test (120° C.×120 hours in a constant temperature chamber).

Flexural strength test was effected at a speed of 50 mm/min.

The results are shown in Table 9.

Examples 26–27 are examples in which the maleic anhydride-modified hydrogenated copolymer rubber of Example 21 shown in Table 8 was used.

In Comparative Example 12, a hydrogenated copolymer rubber of a hydrogenation degree of 54% (unhydrogenated butadiene content=25.0 mole %) was obtained by repeating the same procedure as in Example 14, except that the hydrogenation was stopped in the middle stage.

As is clear from Table 9, the thermoplastic polymer compositions of Examples 22–31, all of this invention, are superior in strength, impact resistance and resistance to heat deterioration.

In contrast, the thermoplastic polymer compositions of Comparative Examples 11–16 use a hydrogenated copolymer rubber not meeting the requirements of this invention and do not have properties as intended by this invention.

Comparative Examples 17–21 contain only thermoplastic resins used in the compositions of Examples 22–31 and Comparative Examples 11–16 and evaluate the properties of these resins.

TABLE 9

| | Example 22 | Example 23 | Example 24 | Example 25 | Example 26 | Example 27 |
|---|---|---|---|---|---|---|
| Compounding recipe of composition (parts) | | | | | | |
| Hydrogenated copolymer rubber | | | | | | |
| Type | Example 13 | Example 14 | Example 15 | Example 16 | Example 21 | Example 21 |
| Amount | 10 | 10 | 10 | 10 | 10 | 20 |
| Thermoplastic resin | | | | | | |
| Polybutylene terephthalate[*1] | 90 | 90 | 90 | 90 | 90 | 80 |
| Polycarbonate[*2] | — | — | — | — | — | — |
| Polyacetal[*3] | — | — | — | — | — | — |
| AS resin[*4] | — | — | — | — | — | — |
| Acrylic resin[*5] | — | — | — | — | — | — |
| Physical properties | | | | | | |
| Flexural strength (kgf/cm$^2$) | 690 | 700 | 690 | 680 | 700 | 630 |
| Flexural modulus (kgf/cm$^2$) | 20,000 | 21,000 | 19,500 | 19,000 | 20,000 | 18,300 |
| Izod impact strength (kgf/cm$^2$) | 15 | 17 | 14 | 14 | 15 | 19 |
| Izod impact strength after thermal deterioration (120° C. × 120 hours) | 14 | 15 | 12 | 13 | 14 | 17 |

TABLE 9-continued (kgf/cm²)

|  | Example 28 | Example 29 | Example 30 | Example 31 | Comp. Ex. 11 |
|---|---|---|---|---|---|
| Compounding recipe of composition (parts) | | | | | |
| Hydrogenated copolymer rubber | | | | | |
| Type | Example 14 | Example 14 | Example 14 | Comp. 14 | Ex. 9 |
| Amount | 10 | 10 | 10 | 10 | 10 |
| Thermoplastic resin | | | | | |
| Polybutylene terephthalate*¹ | — | — | — | — | 90 |
| Polycarbonate*² | 90 | — | — | — | — |
| Polyacetal*³ | — | 90 | — | — | — |
| AS resin*⁴ | — | — | 90 | — | — |
| Acrylic resin*⁵ | — | — | — | 90 | — |
| Physical properties | | | | | |
| Flexural strength (kgf/cm²) | 780 | 800 | 1,000 | 750 | 680 |
| Flexural modulus (kgf/cm²) | 21,000 | 24,500 | 32,000 | 27,500 | 19,500 |
| Izod impact strength (kgf/cm²) | 39 | 14 | 9 | 11 | 7 |
| Izod impact strength after thermal deterioration (120° C. × 120 hours) (kgf/cm²) | 35 | 11 | 7 | 10 | 4 |

|  | Comp. Ex. 12 | Comp. Ex. 13 | Comp. Ex. 14 | Comp. Ex. 15 | Comp. Ex. 16 |
|---|---|---|---|---|---|
| Compounding recipe of composition (parts) | | | | | |
| Hydrogenated copolymer rubber | | | | | |
| Type | Comp. Ex. 14 (hydrogenation degree = 54%) | Comp. Ex. 9 | Comp. Ex. 9 | Comp. Ex. 9 | Comp. Ex. 9 |
| Amount | 10 | 10 | 10 | 10 | 10 |
| Thermoplastic resin | | | | | |
| Polybutylene terephthalate*¹ | 90 | — | — | — | — |
| Polycarbonate*² | — | 90 | — | — | — |
| Polyacetal*³ | — | — | 90 | — | — |
| AS resin*⁴ | — | — | — | 90 | — |
| Acrylic resin*⁵ | — | — | — | — | 90 |
| Physical properties | | | | | |
| Flexural strength (kgf/cm²) | 690 | 750 | 810 | 850 | 750 |
| Flexural modulus (kgf/cm²) | 20,000 | 20,000 | 23,500 | 29,000 | 27,000 |
| Izod impact strength (kgf/cm²) | 13 | 15 | 5 | 2 | 7 |
| Izod impact strength after thermal deterioration (120° C. × 120 hours) (kgf/cm²) | 6 | 7 | 4 | 2 | 6 |

|  | Comp. Ex. 17 | Comp. Ex. 18 | Comp. Ex. 19 | Comp. Ex. 20 | Comp. Ex. 21 |
|---|---|---|---|---|---|
| Compounding recipe of composition (parts) | | | | | |
| Hydrogenated copolymer rubber | | | | | |
| Type | — | — | — | — | — |
| Amount | — | — | — | — | — |
| Thermoplastic resin | | | | | |
| Polybutylene terephthalate*¹ | 100 | — | — | — | — |
| Polycarbonate*² | — | 100 | — | — | — |
| Polyacetal*³ | — | — | 100 | — | — |
| AS resin*⁴ | — | — | — | 100 | — |
| Acrylic resin*⁵ | — | — | — | — | 100 |
| Physical properties | | | | | |
| Flexural strength (kgf/cm²) | 760 | 870 | 900 | 1,200 | 900 |
| Flexural modulus (kgf/cm²) | 22,000 | 23,000 | 26,000 | 34,400 | 30,000 |
| Izod impact strength (kgf/cm²) | 5 | 26 | 5 | 2 | 4 |
| Izod impact strength after thermal deterioration (120° C. × 120 hours) (kgf/cm²) | 4 | 9 | 5 | 2 | 4 |

*¹NOVADUR 5010, a product of Mitsubishi Chemical Industries, Ltd.
*²IUPILON S-2000, a product of MITSUBISHI GAS CHEMICAL CO., INC.
*³DURACON M25-1, a product of Polyplastic K.K.
*⁴JSR AS230, a product of Japan Synthetic Rubber Co., Ltd.
*⁵Methyl metacrylate polymer

EXAMPLES 32-35 AND COMPARATIVE EXAMPLES 22-25

The rubbers and compounding agents shown in Table 10 were kneaded by a roll to obtain each crosslinkable rubber composition. Each composition was crosslinked under the conditions shown in the lower column of Table 10. The resulting crosslinked product was measured for properties. The results are shown in Table 11.

The followings are clear from the results of Table 11: the composition of an acrylic rubber alone, is improved in mechanical properties and low-temperature resistance (which are drawbacks of acrylic rubbers). (In other properties, the two types of compositions show substantially no difference.)

The blend of a crosslinkable rubber composition of this invention and an acrylonitrile-butadiene rubber, as compared with the composition of an acrylonitrile-butadiene rubber alone, is improved in ozone resistance and heat resistance.

TABLE 10

|  | Example 32 | Example 33 | Example 34 | Example 35 | Comp. Ex. 22 | Comp. Ex. 23 | Comp. Ex. 24 | Comp. Ex. 25 |
|---|---|---|---|---|---|---|---|---|
| Compounding recipe (parts) | | | | | | | | |
| Hydrogenated copolymer rubber Type | B | B | B | B | — | — | — | — |
| Amount | 50 | 50 | 50 | 50 | — | — | — | — |
| Fluororubber-1*1 | 50 | — | — | — | 100 | — | — | — |
| Fluororubber-1*2 | — | 50 | — | — | — | 100 | — | — |
| Acrylic rubber*3 | — | — | 50 | — | — | — | 100 | — |
| Acrylonitrile-butadiene rubber*4 | — | — | — | 50 | — | — | — | 100 |
| Carbon black (HAF) | — | — | — | 40 | — | — | — | 40 |
| Carbon black (FEF) | — | — | 50 | — | — | — | 50 | — |
| Carbon black (MT) | 25 | 25 | — | — | 25 | 25 | — | — |
| Stearic acid | — | — | 1 | 1 | — | — | 1 | 1 |
| Sodium stearte | 1.0 | — | — | — | 2 | — | — | — |
| Zinc oxide | — | — | — | 5 | — | — | — | 5 |
| Percumyl D*5 | — | — | — | 1.6 | — | — | — | 1.6 |
| PERKADOX 14/40*6 | 1 | 1 | 1.5 | — | 1 | 1 | 1.5 | — |
| TAIC*7 | 5 | 5 | — | — | 5 | 5 | — | — |
| VULNOC PM*8 | — | — | 1.5 | — | — | — | 1.5 | — |
| NOCRAC CD*9 | 1 | 1 | 1 | 1 | — | — | 1 | 1 |
| Crosslinking conditions | | | | | | | | |
| Press vulcanisation | 170° C. × 20 min | 170° C. × 20 min | 170° C. × 20 min | 160° C. × 40 min | 170° C. × 20 min | 170° C. × 20 min | 170° C. × 20 min | 160° C. × 40 min |

Note:
*1AFLAS 150P, a product of Japan Synthetic Rubber Co., Ltd.
*2DAI-EL G-902, a product of DAIKIN INDUSTRIES, LTD.
*3Composed of 99.7% of ethyl acrylate and 0.3% of vinyl acrylate
*4N241H, a product of Japan Synthetic Rubber Co., Ltd.
*5Dicumyl peroxide, a product of NIPPON OIL & FATS CO., LTD.
*6 to *9See the footnotes of Table 2.

TABLE 11

|  | Example 32 | Example 33 | Example 34 | Example 35 | Comp. Ex. 22 | Comp. Ex. 23 | Comp. Ex. 24 | Comp. Ex. 25 |
|---|---|---|---|---|---|---|---|---|
| Properties of crosslinked product | | | | | | | | |
| Tensile strength (kgf/cm$^2$) | 168 | 170 | 150 | 175 | 173 | 178 | 122 | 190 |
| Elongation (%) | 260 | 270 | 300 | 230 | 270 | 310 | 320 | 190 |
| Hardness (JIS A) | 69 | 70 | 70 | 71 | 70 | 69 | 69 | 74 |
| Heat resistance (heating by air)*1 | | | | | | | | |
| Change of tensile strength (%) | −10 | −9 | −13 | −12 | +10 | +11 | −5 | −18 |
| Change of elongation (%) | −11 | −10 | −14 | −24 | +7 | +9 | −2 | −62 |
| Change of hardness (point) | +4 | +4 | +6 | +6 | +2 | +3 | +3 | +16 |
| Low-temperature torsion test (Gehman) | | | | | | | | |
| $T_{10}$ (°C.) | −18 | −20 | −25 | −37 | +4 | −5 | −12 | −32 |
| Compression set (150° C. × 70 hours, 25% compression) | | | | | | | | |
| Cs (%) | 24 | 22 | 25 | 26 | 29 | 24 | 26 | 32 |
| Ozone deterioration test (50 pphm, 40° C., dynamic 0-20%) | | | | | | | | |
| Time to first appearance of cracking | No cracking for 168 hours | Same as left | Same as left | 24 hours | No cracking for 168 hours | Same as left | Same as left | 5 hours |

Note:
*1Test temperature and time were 175° C. × 70 hours in Examples 32-34 and Comparative Examples 22-24 and 150° C. × 70 hours in Example 35 and Comparative Example 25.

The blend of a crosslinkable rubber composition with a fluororubber, as compared with the composition of a fluororubber alone, is significantly improved in low-temperature resistance (which is a drawback of fluororubbers). (In other properties, the two types of compositions show substantially no difference.)

The blend of a crosslinkable rubber composition of this invention with an acrylic rubber, as compared with

What is claimed is:

1. A cross-linkable hydrogenated copolymer rubber which is a hydrogenation product of a random copolymer rubber that is oil-resistant when cross-linked consisting of:

(A) 30-70 mole % of a unit derived from at least one monomer selected from the group consisting of alkyl acrylates and alkoxy-substituted alkyl acrylates, (B) 20-70 mole % of a unit derived from at least one conjugated diene, and

(C) 0-10 mole % of a unit derived from at least one other ethylenically unsaturated compound copolymerizable with the components (A) and (B) wherein 90-99% of the double bonds of the conjugated diene unit are hydrogenated.

2. The hydrogenated copolymer rubber according to claim 1, wherein the unit (C) is a unit derived from at least one ethylenically unsaturated compound having at least one functional group selected from the group consisting of carboxyl group, amino group, epoxy group and hydroxyl group and the proportion of said unit is 0.1-10 mole %.

3. The hydrogenated copolymer rubber according to claims 1 or 2, wherein the unit (A) is a unit derived from at least one monomer selected from the group consisting of alkyl acrylates represented by the formula (I):

(I)

wherein $R^1$ is a $C_{1-18}$ alkyl group, and alkoxy-substituted alkyl acrylates represented by the formula (II):

(II)

wherein $R^2$ is a methylene group, a $C_{2-12}$ alkylene group or a $C_{2-12}$ alkylidene group and $R^3$ is a $C_{1-12}$ alkyl group.

4. The hydrogenated copolymer rubber according to claim 3, wherein the alkyl acrylates of the formula (I) include methyl acrylate, ethyl acrylate, n-propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate and n-octadecyl acrylate, and the alkoxy-substituted alkyl acrylates of the formula (II) include 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate and 2-(n-butoxy)propyl acrylate.

5. The hydrogenated copolymer rubber according to claim 3, wherein the alkyl acrylates of the formula (I) are methyl acrylate, ethyl acrylate, n-propyl acrylate and n-butyl acrylate and the alkoxy-substituted alkyl acrylates are 2-methoxyethyl acrylate and 2-ethoxyethyl acrylate.

6. The hydrogenated copolymer rubber according to claims 1 or 2, wherein the unit (B) is a unit derived from at least one conjugated diene selected from the group consisting of 1,3-butadiene, 1,3-pentadiene, isoprene, 2-neopentyl-1,3-butadiene, 1,3-hexadiene, 2,4-hexadiene, 2,3-dimethyl-1,3-butadiene, 2-ethyl-1,3-butadiene and 1,3-heptadiene.

7. The hydrogenated copolymer rubber according to claims 1 or 2, wherein the unit (B) is a unit derived from at least one conjugated diene selected from the group consisting of 1,3-butadiene and isoprene.

8. The hydrogenated copolymer rubber according to claim 1, wherein the unit (C) is a unit derived from at least one compound selected from the group consisting of methacrylates, alkyl vinyl ketones, substituted or unsubstituted alkyl vinyl ethers, allyl alkyl ethers, alkenyl aromatic compounds, alkenyl cyanides, unsaturated carboxylic acid amides, vinyl chloride, vinylidene chloride, vinyl acetate, vinyl chloroacetate, and ethylenically unsaturated compounds having at least one functional group selected from the group consisting of carboxyl group, epoxy group and hydroxyl group.

9. The hydrogenated copolymer rubber according to claim 2, wherein the unit (C) is a unit derived from at least one compound selected from the group consisting of acrylic acid, methacrylic acid, maleic acid, fumaric acid, dimethylaminoethyl (meth)acrylate, diethylaminoethyl (meth)acrylate, N-t-butylaminoethyl (meth)acrylate, 4-anilinophenyl (meth)acrylate, glycidyl (meth)acrylate, allyl glycidyl ether, vinyl glycidyl ether, 2-hydroxypropyl (meth)acrylate and hydroxyethyl (meth)acrylate.

10. The hydrogenated copolymer rubber according to claim 2, wherein the unit (C) is a unit derived from a compound selected from the group consisting of acrylic acid, methacrylic acid, maleic acid and fumaric acid.

11. The hydrogenated copolymer rubber according to claims 1 or 2, wherein the copolymer rubber has a polystyrene-reduced weight-average molecular weight of 30,000-5,000,000.

12. A thermoplastic polymer composition comprising 1-80 parts by weight of a hydrogenated copolymer rubber according to claim 2 and 20-99 parts by weight of a thermoplastic resin.

13. The hydrogenated copolymer rubber according to claim 1, wherein the proportion of the (B) component is 33-67 mol %.

* * * * *